United States Patent
Walenta

(10) Patent No.: US 9,079,463 B2
(45) Date of Patent: Jul. 14, 2015

(54) CONNECTING LINK-ASSEMBLY WITHOUT TOOL

(71) Applicant: Pewag Austria GmbH, Graz (AT)

(72) Inventor: Walter Walenta, Graz (AT)

(73) Assignee: Pewag Austria GmbH (AT)

( * ) Notice: Subject to any disclaimer, the term of this patent is extended or adjusted under 35 U.S.C. 154(b) by 225 days.

(21) Appl. No.: 13/860,843

(22) Filed: Apr. 11, 2013

(65) Prior Publication Data

US 2013/0283755 A1      Oct. 31, 2013

(30) Foreign Application Priority Data

Apr. 25, 2012    (AT) .................................. A 499/2012

(51) Int. Cl.
| | |
|---|---|
| *F16G 15/00* | (2006.01) |
| *B60C 27/06* | (2006.01) |
| *F16G 15/04* | (2006.01) |
| *B60C 27/08* | (2006.01) |

(52) U.S. Cl.
CPC ................ *B60C 27/062* (2013.04); *B60C 27/08* (2013.01); *F16G 15/00* (2013.01); *F16G 15/04* (2013.01)

(58) Field of Classification Search
CPC ....... F16G 15/00; F16G 15/04; B60C 27/062; B60C 27/08

USPC .......................................... 59/85, 86; 152/243
See application file for complete search history.

(56) References Cited

U.S. PATENT DOCUMENTS

| | | | | |
|---|---|---|---|---|
| 649,460 | A | * | 5/1900 | Jordan .............................. 59/85 |
| 1,347,725 | A | * | 7/1920 | Weiss ................. 59/85 |
| 2,217,052 | A | * | 10/1940 | Hall .................................. 59/85 |
| 3,027,615 | A | * | 4/1962 | Forney .............................. 59/93 |
| 3,595,292 | A | * | 7/1971 | Muller .......................... 152/243 |
| 5,878,565 | A | * | 3/1999 | Grootveld .......................... 59/85 |

\* cited by examiner

*Primary Examiner* — David B Jones
(74) *Attorney, Agent, or Firm* — Design IP

(57) ABSTRACT

A connecting lock for tire chains, comprising an elongate receiving opening for receiving two chain links, framed by a first longitudinal crosspiece, an opposed, a second longitudinal crosspiece interrupted by an insertion opening, and two transverse crosspieces. The chain links in the receiving opening are secured from sliding out by means of a closing bolt, which can be inserted via one end into a blind bore in the first longitudinal crosspiece. A threaded bore leads in the first longitudinal crosspiece to the blind bore, starting from a side face. A spring pressure piece is screwed into the threaded bore. A spring-loaded detent part of said spring pressure piece is directed into the blind bore. When the closing bolt is inserted into the blind bore, the spring-loaded detent is latched into a recess in the periphery of said closing bolt.

5 Claims, 3 Drawing Sheets

CONNECTING LINK-ASSEMBLY WITHOUT TOOL

CROSS REFERENCE TO RELATED APPLICATIONS

This application claims the benefit of Austrian Application No. 499/2012, filed Apr. 25, 2012.

BACKGROUND OF THE INVENTION

The invention relates to a connecting lock for tire chains with an elongate receiving opening for receiving two chain links, wherein the receiving opening is framed by a first continuous longitudinal crosspiece, by a second, opposed longitudinal crosspiece interrupted by an insertion opening, and by two transverse crosspieces, and the chain links in the receiving opening are secured from sliding out by means of a closing bolt, which can be inserted via one end into a bore in the first longitudinal crosspiece and is directed via its second, free end toward the insertion opening in the second longitudinal crosspiece.

A connecting lock of this type is disclosed for example in DE 16 05 670 B2. With this known connecting lock, the closing bolt is a spiral locking pin, which is inserted into the bore, formed as a through-bore, in the first longitudinal crosspiece in order to secure the chain links. However, if the application of force for insertion of the locking pin is high, a hammer is required for this purpose and there is a significant risk of damage as a result of splintering of the spiral locking pin as it is driven into the bore. The disassembly of the lock by removal of the spiral locking pin is also problematic, since the pin has to be removed with the aid of a hammer and a punch. In practice, the spiral locking pin is often so corroded however that the connecting lock has to be cut through using a blowtorch in order to release the chain links.

Another connecting link of the objective type has become known from DE 765 176 B. With this connecting link, the closing bolt is mounted displaceably in the bore in the first longitudinal crosspiece and it carries on its outer end facing the tread of a vehicle tire a widening in the form of a head, which bears against the tread during use so that the bolt is held in a locked position and the chain links are secured from sliding out from the connecting lock. A disadvantage of this solution is the fact that, with looser chains, it is not ensured that the head of the closing bolt will bear against the tread, and therefore the bolt may slip and the chain links may be released in an undesired manner.

SUMMARY OF THE INVENTION

The object of the invention is to provide a connecting lock that does not exhibit these disadvantages.

Proceeding from a connecting lock of the type mentioned in the introduction, this object is achieved in that, in accordance with the invention, the bore in the first longitudinal crosspiece is formed as a blind bore, a threaded bore leads in the first longitudinal crosspiece to the blind bore, starting from a side face, a spring pressure piece is screwed into the threaded bore, the spring-loaded detent part of said spring pressure piece being directed into the blind bore and, when a closing bolt is inserted into the blind bore, latching into a recess on the periphery of said closing bolt.

Thanks to the invention, a connecting lock is obtained that has a number of advantages: The lock is to be assembled by hand without tools, wherein a risk of damage as a result of splintering parts is avoided. Disassembly after a winter season or in order to shorten the chain can be performed easily by lifting out the closing bolt using a screwdriver. Compared to a spiral locking pin, which sometimes shears in practice, the security against fracture of the solid closing bolt is greater. Since a blind bore is provided, which is closed on the tread side, no dirt can penetrate from there.

In an expedient variant, the recess in the closing bolt can be formed as a peripheral groove in order to simplify assembly.

In this sense, it is also advantageous if the detent part is formed as a ball.

In order to limit the diameter of the blind bore with good security of the chain links and in order to enable the removal of the closing bolt with the aid for example of a screwdriver, it is recommended for the closing bolt to have a diameter in the portion sitting in the threaded bore that is smaller than the diameter of portion that lies in the receiving opening when the lock is assembled.

BRIEF DESCRIPTION OF THE DRAWINGS

The invention and also further advantages will be explained in greater detail hereinafter on the basis of an exemplary embodiment, which is illustrated in the drawing, in which.

DETAILED DESCRIPTION OF THE PREFERRED EMBODIMENTS

Figure 1:
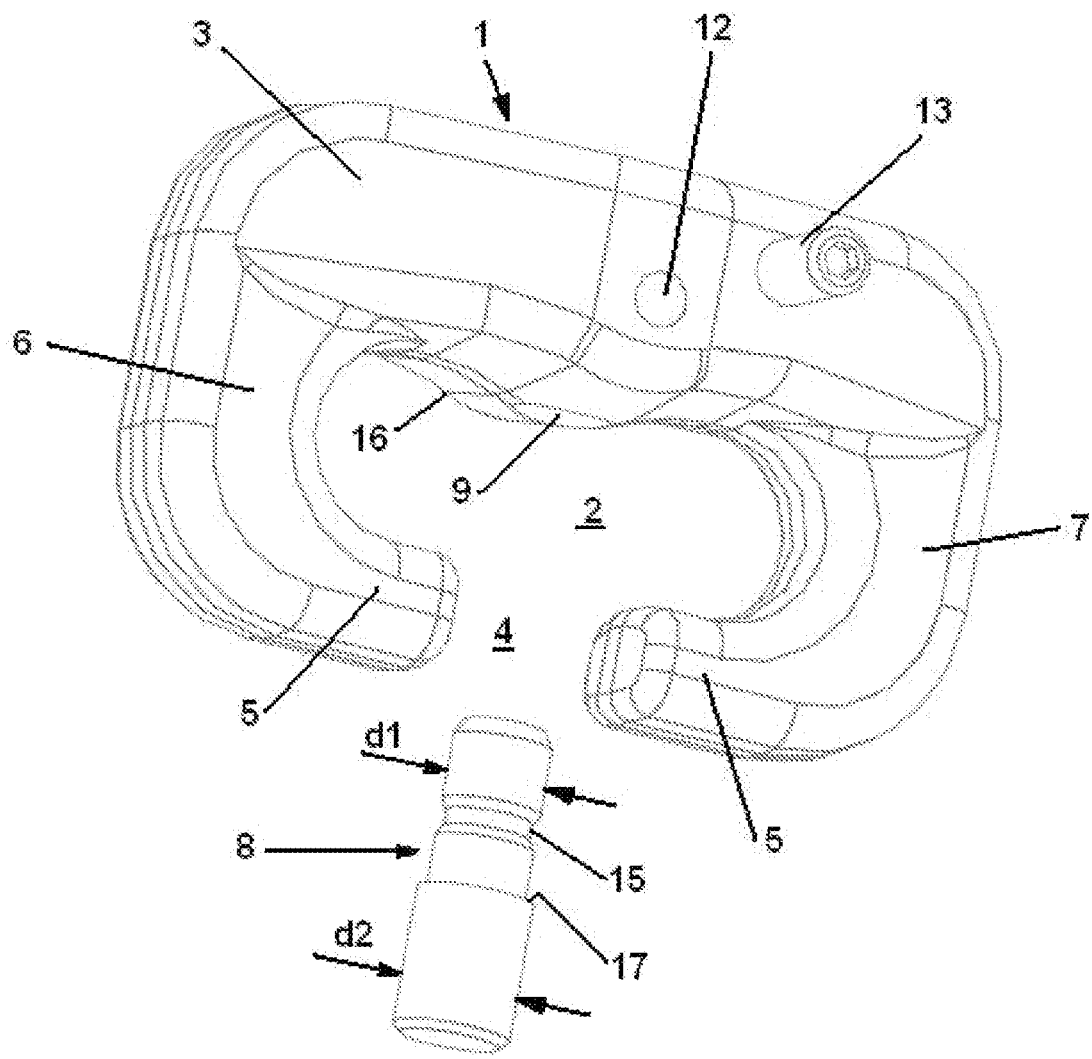
FIG. 1 shows a schematic illustration of a connecting lock according to the invention before the assembly of the closing bolt.
Figure 2:
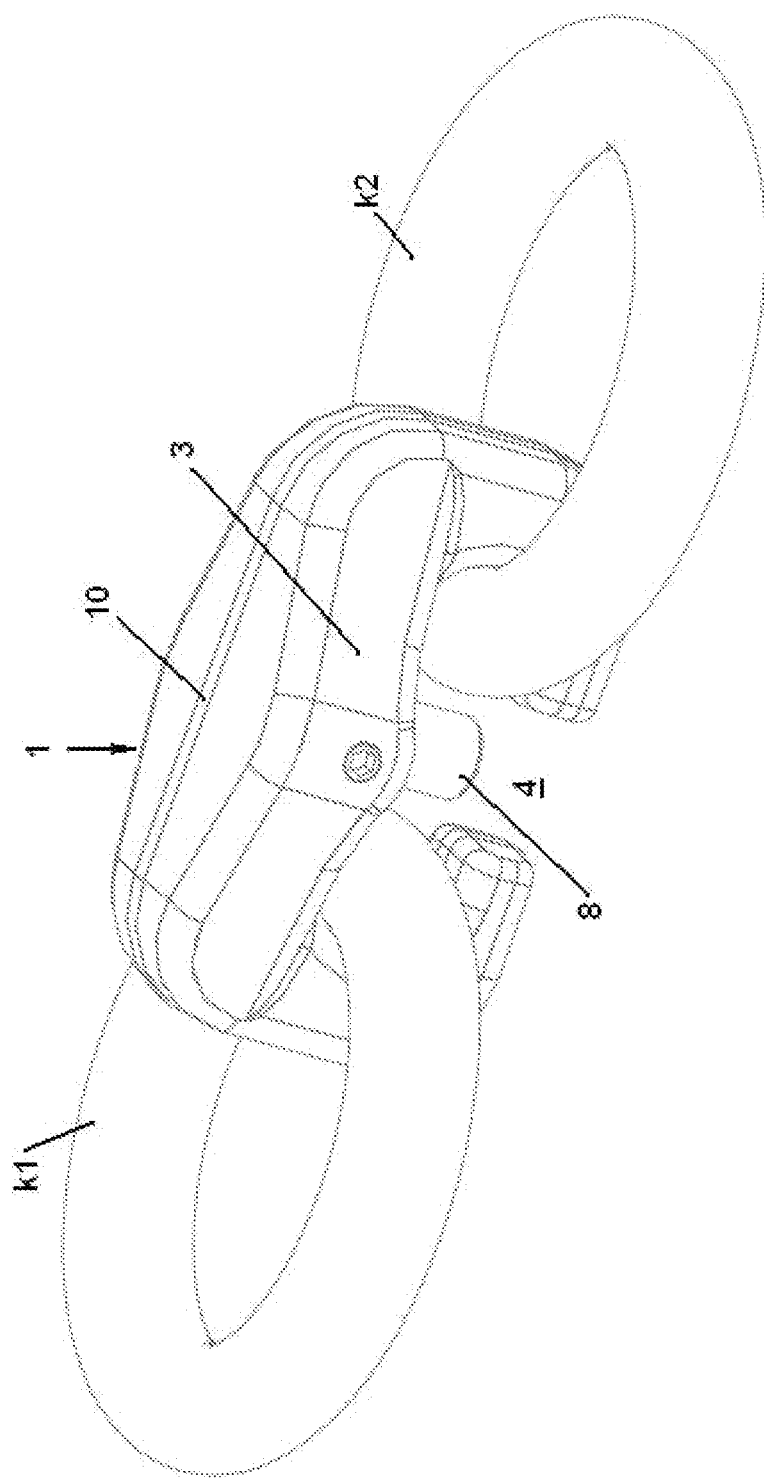
FIG. 2 shows the connecting lock according to FIG. 1 with fixed chain links and assembled closing bolt, likewise in a schematic illustration.
Figure 3:
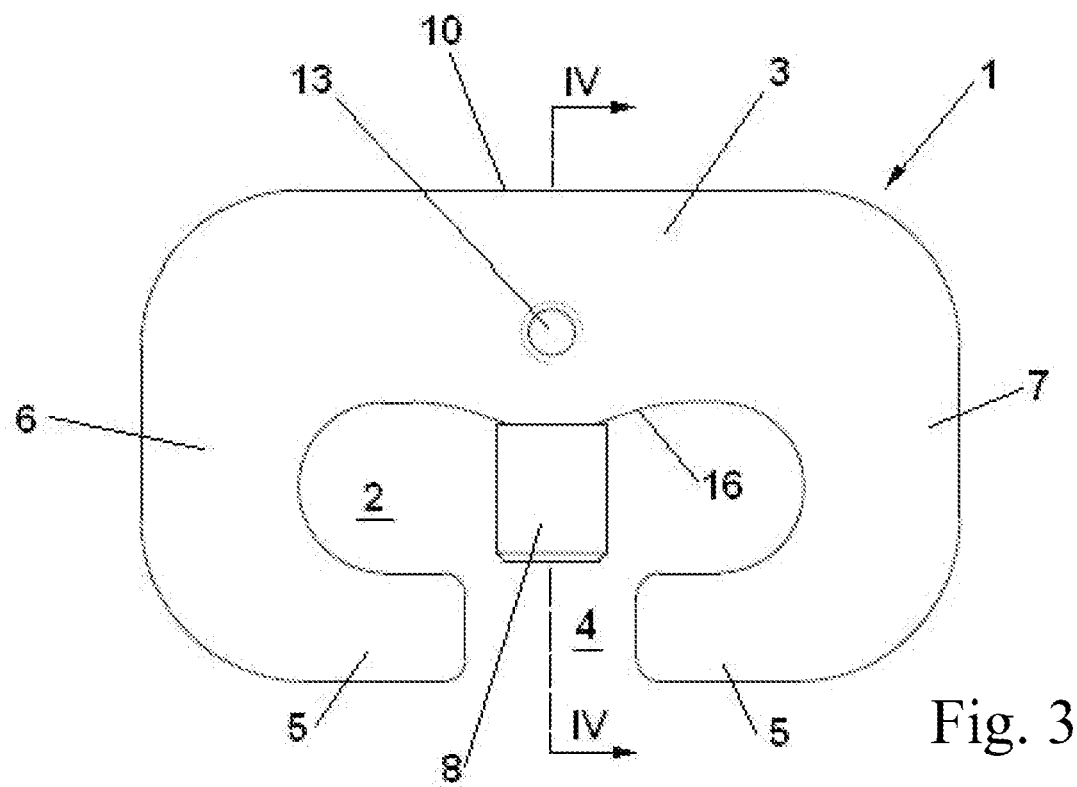
FIG. 3 shows a side view of a connecting lock as claimed in the invention with an assembled closing bolt and spring pressure piece.

As can be seen from FIGS. 1 to 4, a connecting lock 1 as claimed in the invention has an elongate receiving opening 2 for receiving two chain links k1, k2, which may be part of a chain mesh of a tire chain, in particular of a snow chain or tire protection chain. The receiving opening 2 formed in the connecting lock is framed by a first continuous longitudinal crosspiece 3, by an opposed, second longitudinal crosspiece 5 interrupted by an insertion opening 4, and by two transverse crosspieces 6, 7. When the lock 1 is assembled, the chain links k1, k2 in the receiving opening 2 are secured from sliding out by means of a closing bolt 8. This closing bolt 8 is substantially circular cylindrical and can be inserted via one end into a bore 9 in the first longitudinal crosspiece 3. It is then directed via its second, free end toward the insertion opening 4 in the second longitudinal crosspiece 3. As can be seen from FIG. 4, the bore 9 is formed as a blind bore, that is to say is open to the opening 2, but is closed to an outer face 10, which is directed toward the road.

To secure the closing bolt 8 from falling out from the bore 9, a threaded bore 12 leads in the first longitudinal crosspiece 3 to the blind bore 9, starting from a side face 11 (see FIG. 4), wherein a spring pressure piece 13 is screwed into this threaded bore 12. The spring-loaded detent part 14 of the spring pressure piece 13, in this case formed as a ball, is directed into the blind bore and, when the closing bolt 8 is inserted, latches into a recess 15 at the periphery of said closing bolt (see FIG. 4). The recess 15 is advantageously formed as a peripheral groove, as in the embodiment shown.

Spring pressure pieces are commercially obtainable in many dimensions, for example with threads M3 to M20, wherein the detent part is formed either as a ball or as a bolt, for example see www.bossard.com.

For assembly of the lock 1, starting from the situation as claimed in FIG. 1, presuming the spring pressure piece 13 is already screwed into the threaded bore, the closing bolt 8 is pressed into the bore 9, wherein the detent part 14 of the spring pressure piece 13 is initially forced outwardly, which is facilitated by the chamfered end of the bolt 8. As the bolt 8 is pressed further into the bore 9, the recess 15 reaches the region of the spring pressure piece 13 and the detent part 14 latches into said recess 15 so that the bolt 8 is then secured from falling out. If the two chain links k1, k2 have been introduced into the opening 2 in the manner shown in FIG. 2 before the described assembly, these chain links are then secured from sliding out by the closing bolt 8, since it is dimensioned such that the insertion opening 4 is at least blocked to the extent that the chain links k1, k2 cannot slide through between the remaining gap between the free end of the bolt 8 and the two ends of the second longitudinal crosspiece 5, between which the insertion opening 4 is arranged.

Figure 4:
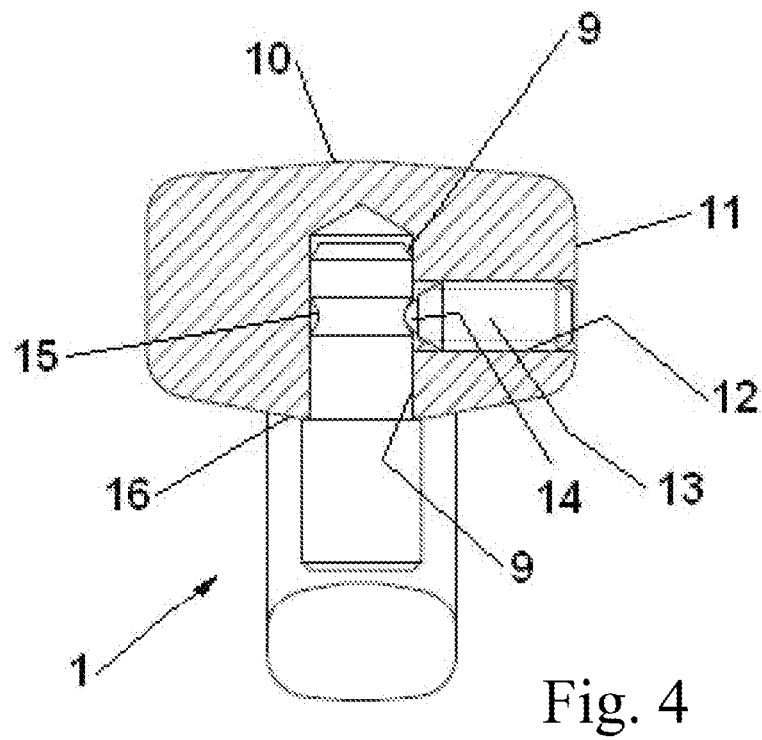
FIG. 4 shows a sectional view along the line IV-IV in FIG. 3.

As is clear from FIGS. 1 and 4, the closing bolt 8 has a diameter d1 in each portion via which it is inserted into the blind bore 12, but, in the portion that lies in the receiving opening 2 when the lock 1 is assembled, has a slightly larger diameter d2. Since, on the other hand, the inner face 16 of the first longitudinal crosspiece 3 is curved inwardly toward the opening 2, it is possible to apply a simple tool, for example a screwdriver, to the protruding edge 17 (see FIG. 1) of the portion of the bolt 8 of larger diameter in order to remove the bolt 8, and to bring the bolt out of engagement with the detent part 14 of the spring pressure piece 13, wherein this detent part is forced back against the force of the spring that is assembled in the spring pressure piece 13, but is not visible.

As can be seen from the Figures, the first longitudinal crosspiece 3, in which the bore 9 is formed, is thicker than the transverse crosspieces 6, 7 and the second longitudinal crosspiece 5. More specifically, with the aforementioned curvature in the region of the blind bore 9, the first longitudinal crosspiece is approximately twice as thick as the second longitudinal crosspiece 5 in a direction parallel to the axis of the bolt 8 and parallel to the transverse crosspieces 6, 7. The first longitudinal crosspiece 3 is also thicker than the second longitudinal crosspiece 5 in a direction parallel to the axis of the threaded bore 12, wherein the greatest thickness is provided in the region of the threaded bore 12 and the blind bore 9.

The connecting lock is manufactured for example from case-hardened steel, and its closing bolt 8 is manufactured from quenched and tempered steel. In view of the use, for example with a snow chain, a rust-resistant variant can be used for the spring pressure piece 13.

While the principles of the invention have been described above in connection with preferred embodiments, it is to be clearly understood that this description is made only by way of example and not as a limitation of the scope of the invention.

The invention claimed is:

1. A connecting lock for tire chains, comprising:
a first longitudinal crosspiece having a first end, a second end, an inner face, an outer face, and a side face, the inner face having a blind bore that extends toward the outer face, the side face having a threaded bore that intersects the blind bore, the threaded bore having threads;
a first transverse crosspiece attached to the first end of the first longitudinal crosspiece and extending therefrom at a non-parallel angle;
a second transverse crosspiece attached to the second end of the first longitudinal crosspiece and extending therefrom at a non-parallel angle;
a second longitudinal crosspiece comprising a first portion attached to the first transverse crosspiece and extending therefrom at a non-parallel angle and a second portion attached to the second transverse crosspiece and extending therefrom at a non-parallel angle, the first portion and second portion defining an insertion opening therebetween;
a spring pressure piece that is installable into the threaded bore by screwing threads located on the spring pressure piece into the threads of the threaded bore, the spring pressure piece having a spring loaded detent part that is located at least partially within the blind bore when the spring pressure piece is fully installed into the threaded bore; and
a closing bolt including a first portion having a recess and a second portion, the closing bolt being releasably securable within the blind bore by inserting the first portion of the closing bolt into the blind bore until the recess engages the spring loaded detent part of the spring pressure piece when the spring pressure piece is fully installed into the threaded bore;
wherein the first longitudinal crosspiece, first transverse crosspiece, second transverse crosspiece, and second longitudinal crosspiece define an elongate receiving opening that is sized to receive a pair of chain links therein, wherein the second portion of the closing bolt extends into the elongate receiving opening toward the insertion opening and would prevent removal of the pair of chain links from the elongate receiving opening when the closing bolt is secured within the blind bore.

2. The connecting lock of claim 1, wherein the recess is formed as a peripheral groove.

3. The connecting lock of claim 1, wherein the spring loaded detent part is formed as a ball.

4. The connecting lock of claim 1, wherein the first portion of the closing bolt has a first diameter that approximately corresponds with a diameter of the blind bore, and the second portion of the closing bolt has a second diameter, wherein the second diameter is greater than the first diameter.

5. The connecting lock of claim 1, wherein the first longitudinal crosspiece, first transverse crosspiece, second transverse crosspiece, and second longitudinal crosspiece are formed as a single piece.

\* \* \* \* \*